H. J. HORN.
AEROPLANE STAY AND THE LIKE.
APPLICATION FILED MAY 23, 1918.
1,403,553.
Patented Jan. 17, 1922.
4 SHEETS—SHEET 1.
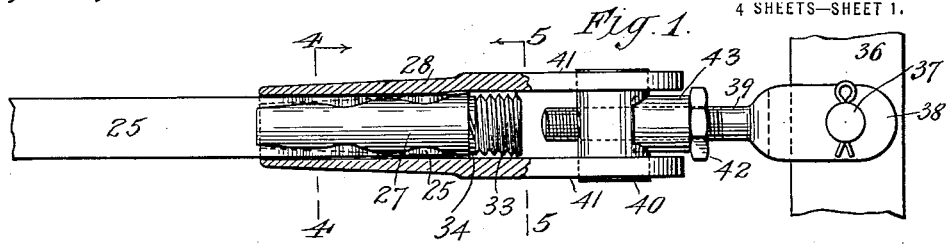
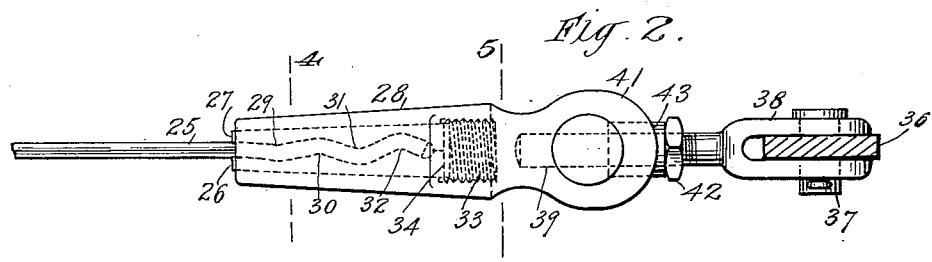
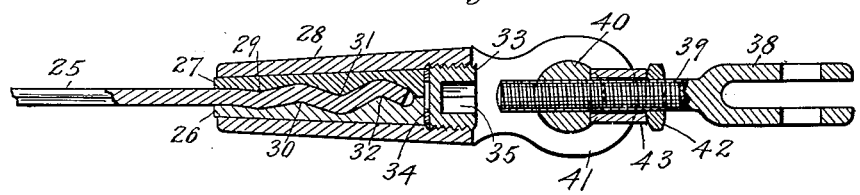
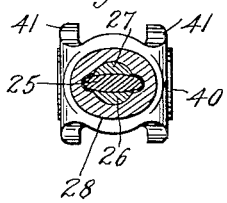
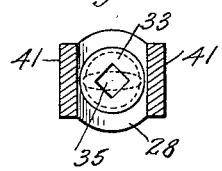
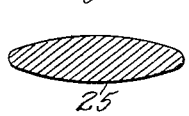
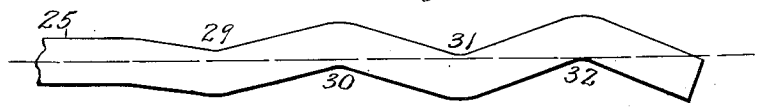
Inventor:
Harold J. Horn
by his Attys:

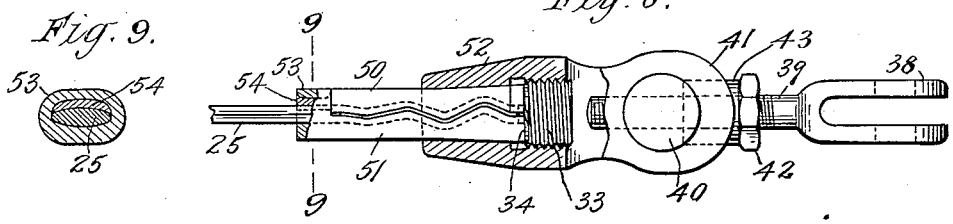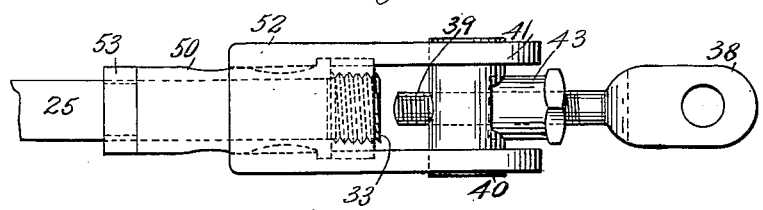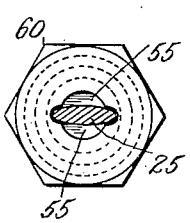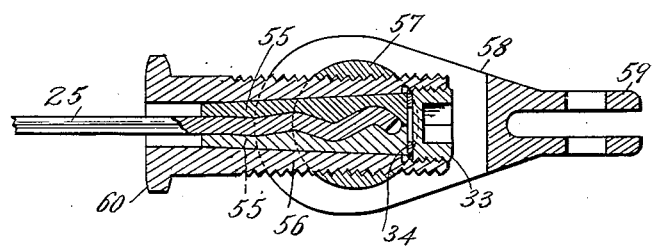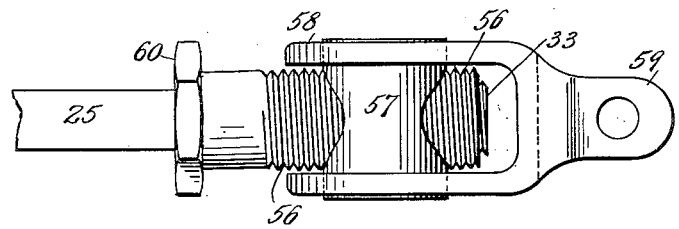

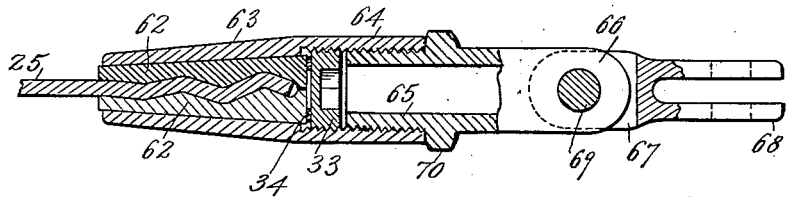
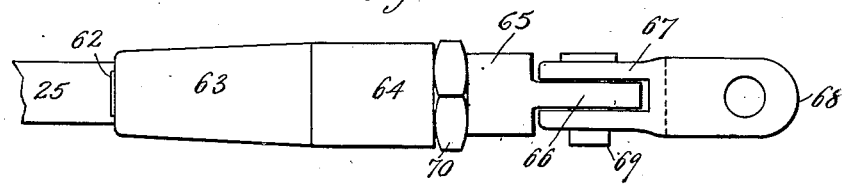
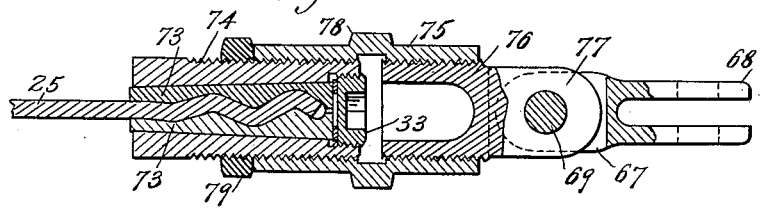
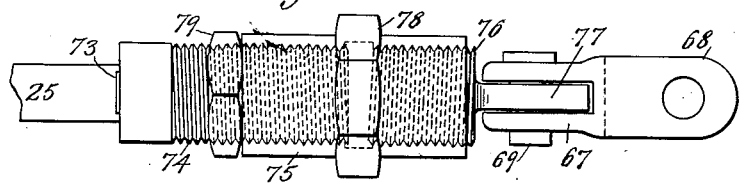
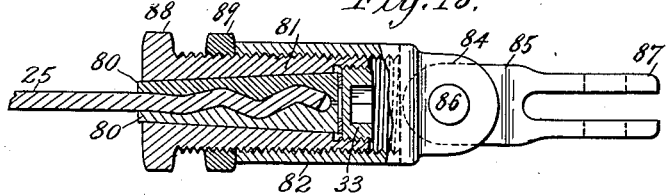
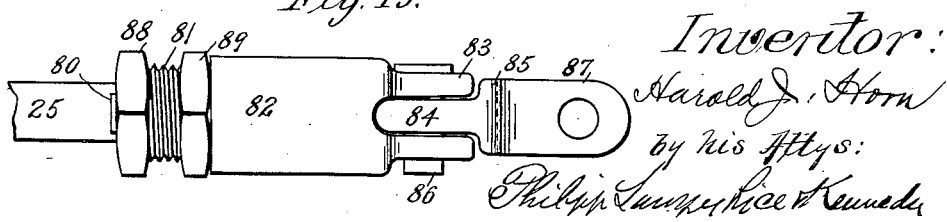

H. J. HORN.
AEROPLANE STAY AND THE LIKE.
APPLICATION FILED MAY 23, 1918.
1,403,553.
Patented Jan. 17, 1922.
4 SHEETS—SHEET 4.
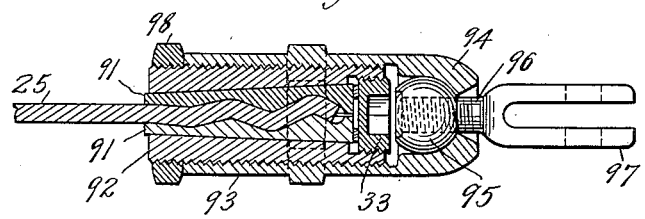
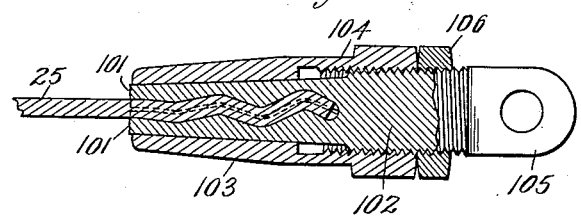
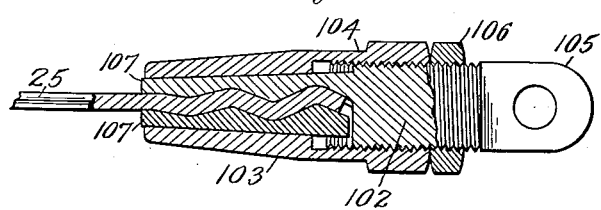
Inventor:
Harold J. Horn
by his Attys:
Philip Lawrey Rice & Kennedy

UNITED STATES PATENT OFFICE.

HAROLD J. HORN, OF TRENTON, NEW JERSEY, ASSIGNOR TO JOHN A. ROEBLING'S SONS COMPANY, OF TRENTON, NEW JERSEY, A CORPORATION OF NEW JERSEY.

AEROPLANE STAY AND THE LIKE.

1,403,553.  Specification of Letters Patent.  Patented Jan. 17, 1922.

Application filed May 23 1918. Serial No. 236,133.

*To all whom it may concern:*

Be it known that I, HAROLD J. HORN, a citizen of the United States, residing at Trenton, county of Mercer, and State of New Jersey, have invented certain new and useful Improvements in Aeroplane Stays and the like, fully described and represented in the following specification and the accompanying drawings, forming a part of the same.

This invention relates to aeroplane stays and the like.

In certain structures such, for example, as aeroplanes, it has been found difficult to effectively anchor the ends of the stay wires, especially those of the flattened or stream line type.

It is the especial object of the present invention to provide means for properly and effectively anchoring the ends of such aeroplane stays, but the invention is applicable also to anchoring or attaching metal wires or bands of other forms, and for other purposes.

The following specification describes and the accompanying drawings illustrate various embodiments of the invention, it being understood that changes may be made in the form, construction and arrangement of the parts without departing from the invention.

In the drawings—

Figure 1 is a view in side elevation, with parts in section, of stay anchoring means constructed in accordance with the invention;

Figure 2 is a front elevation of the same;

Figure 3 is a longitudinal section taken through Fig. 2;

Figures 4 and 5 are cross-sectional views taken on the lines 4—4 and 5—5, respectively, of Figs. 1 and 2, looking in the direction of the arrows;

Figure 6 is an enlarged view showing in detail one end of a stay wire and the manner of crimping the same;

Figure 7 is a cross-sectional view of the stay in Fig. 6;

Figure 8 is a view in front elevation with parts in section of a modified construction;

Figure 9 is a cross-sectional view taken on the line 9—9 of Fig. 8;

Figure 10 is a view in side elevation of the same construction;

Figure 11 is a longitudinal sectional view of another modified construction;

Figure 12 is an end elevation of the same;

Figure 13 is a view in side elevation of the same;

Figure 14 is a longitudinal sectional view of another construction;

Figure 15 is a view in side elevation of the same;

Figure 16 is a longitudinal sectional view of another construction;

Figure 17 is a view in side elevation of the same;

Figure 18 is a longitudinal sectional view of another construction;

Figure 19 is a view in side elevation of the same; and

Figures 20, 21 and 22, are longitudinal sectional views of still further modifications.

For purposes of illustration, stays of the flattened or stream wire type are shown and these stays are crimped, as hereinafter described, adjacent the end to be anchored. In structures embodying the invention, the crimped portion of the stay is embraced by a plurality of members corrguated to correspond to the conformation of the stay, and means is provided for holding or clamping these members in interlocking relation with the stay to prevent the latter from pulling loose. The holding means may vary within a wide range, but in structures embodying the invention to the best advantage there is a wedging action between the stay-embracing member and the holding means. Although capable of various constructions, for example, in Figs. 1 to 5, a crimped stay is embraced between two anchoring members 26, 27. These members are separate wedge-shaped plates having a straight surface and an oblique arcuate surface. The straight surfaces are corrugated to correspond to the conformation of the crimped stay, so that the plates may embrace the stay between them in interlocked relation, as shown, for example, in Fig. 3.

The wedge-shaped anchoring members with the stay between them are held in a holder having a wedge-shaped socket. In the embodiment shown the anchoring members 26, 27, are, in the aggregate, substantially frusto-conical, and they are confined in a holder in the form of an open ended frusto-conical sleeve 28. With such a construction the stay cannot pull loose from the anchoring members owing to the interlocking of the crimps and corrugations, and the anchoring members are held in clamping or interlocking position by the holder 28, added strain on the stay only serving to anchor the parts more firmly owing to the wedging action described.

The invention includes provision for obtaining the full strength of the wire and for distributing the strain on the crimps. This is accomplished by varying the degree of the crimps and in structures embodying the invention to the best advantage the crimps gradually increase in degree.

Referring more particularly to Fig. 6, the stay wire 25 is shown formed adjacent its end with a plurality of crimps 29, 30, 31 and 32. These crimps, as will be apparent from the drawings, vary in degree. The first one, 29, is relatively slight, its angle being not far from a straight line. The next crimp, 30, is slightly more pronounced, and this increase in degree is gradual until the final crimp 32 at the end of the stay is fairly sharp. Although four crimps are shown in the drawings, it will be understood that there may be any desired number.

With a construction such as that described, when the stay is anchored and secured in place, the strain on the first crimp is not excessive, the strain being distributed throughout the crimped portion. As a result the full strength of the wire is obtained.

Means is provided for preventing any undue backward movement of the parts when, for example, the strain on the stay is relieved. Although capable of various constructions, in the embodiment illustrated in Figs. 1 to 5, the larger end of the holder 28 is threaded on its interior to receive a removable threaded stop plug or nut 33 held in place by a spring washer 34 and having a central socket 35 for the reception of a wrench or the like. Any tendency of the anchoring members to work back unduly in the holder is prevented by their engagement with the stop plug 33.

Means is provided for connecting the anchored stay with a terminal which may be any portion of the aeroplane or other structure to which the stay is to be secured, and in structures embodying the invention to the best advantage this connection includes a universal joint. As an example, in the embodiment illustrated in Figs. 1 to 5, the terminal shown is a frame bar 36 and there is a universal connection between the bar and the holder. Although capable of various constructions, in the form shown, the bar 36 is embraced by a forked lug 38 secured in place by a pivotal pin 37 on which the forked lug swings. The lug 38 is formed on the end of a connecting stem 39 mounted in a cylindrical swivel bridge 40. This latter member is journaled in parallel eye members 41 formed on the holder 28 beyond the frusto-conical portion. The eye members 41 are in planes at right angles to the plane of the lug 38 and consequently the swivel pin 37 and the swivel bridge 40 are at right angles to each other, thus providing a universal connection between the anchored stay and the terminal.

Means is provided for adjusting the connection between the stay and terminal in order to take up slack and the like. Although capable of various constructions, in the embodiment just described, the stem 39 is threaded through the bridge 40 and consequently the relative position of the holder 28 and the stem may be varied as desired. To lock the parts in adjusted position, a lock nut 42 is provided which bears against a sleeve 43 embracing the stem 39 and engaging the bridge 40 which is cut away to receive the same, as shown in Figs. 1 and 3.

In Figs. 8 to 10 is illustrated a modification. The anchoring members 50, 51, like those described, are wedge-shaped plates, corrugated to conform to the crimped stay 25 and they are held in a frusto-conical holder 52. In this form, however, the outer ends of the anchoring members are interlocked. To this end the plate 51 is provided at its outer end with an eye portion 53. This embraces the stay at the bottom, and extending in between the stay and the top of the eye portion 53 is a tongue 54 formed on the end of the other plate 50. The remainder of the device is like that already described.

In Figs. 11 to 13 is shown a further embodiment. The stay 25 is embraced between anchoring members 55 like those first described, which are held in the wedge-shaped socket of a holder 56, the exterior surface of which is threaded. The interior of the holder is also threaded at its rear end to receive the stop plug 33. Threaded onto the holder 56 is a cylindrical bridge 57 on which swivel the parallel arms of a connecting yoke 58 having also a forked lug 59 for the reception of the swivel pin 37 and the terminal 36. The holder 56 terminates at its forward end in a flange nut 60 and adjustment is obtained by relative movement of holder and bridge.

In the form illustrated in Figs. 14 and 15 the anchoring members 62 are like those first described. The holder 63 has a frusto-conical portion like that of the holder in Fig. 1, and extending rearwardly therefrom is a cylindrical sleeve 64 threaded on the interior to receive a threaded connecting sleeve 65, as well as the stop plug 33. To provide the universal connection with the terminal, the sleeve 65 has a tongue 66 embraced in a forked lug 67 of a yoke having a second forked lug 68 in a plane at right angles to the lug 67. A swivel pin 69 passes through the tongue 66 and the two branches of the lug 67 and the lug 68 is formed to receive the swivel pin 37 for the terminal 36. The sleeve 65 is provided with a flange nut 70 and adjustment is made by relative movement of the sleeve 65 and the holder.

Figs. 16 and 17 illustrate a construction comprising anchoring members 73, similar to those first described, held in the usual wedge-shaped socket formed in a holder 74 which is cylindrical on the exterior surface and threaded to receive a threaded coupling 75. This coupling is also in threaded relation with a connecting sleeve 76 having a tongue 77 similar to the tongue 66 of Figs. 14 and 15. The remainder of the connecting means is identical with that of Figs. 14 and 15 as will be apparent from the drawings. The coupling 75 is provided with a flange nut 78 and adjustment is made by relative movement of the coupling, the holder and the connecting sleeve 76, the usual locking nut 79 being provided. In this form, also, the inner end of the holder 74 is threaded on the interior to receive the stop plug 33.

In Figs. 18 and 19 is illustrated a further modification. Anchoring members 80 like those first described are held in the wedge-shaped socket of a holder 81 cylindrical on its exterior and threaded to receive a connecting sleeve 82. This sleeve is provided at its rear end with a forked lug 83 which embraces a tongue 84 formed on a yoke 85, a swivel pin 86 passing through the two branches of the lug and the tongue. The yoke 85 is also provided with a second forked lug 87 in a plane at right angles to the lug 83 and this lug 87 is formed to receive the swivel pin 37 for the terminal 36 as in the other constructions. The holder 81 is provided at the end with a flange nut 88 and adjustment is made by relative movement of holder and the sleeve 82, the usual locking nut 89 being provided. In this form, also, the stop plug 33, already described, is provided.

Fig. 20 illustrates a modification in which the anchoring members 91 are similar to those first described. They are held in the wedge-shaped socket of a holder 92 cylindrical on its exterior and threaded to receive a sleeve 93. This latter member, at its other end, is rounded and closed in to form a substantially spherical cup or socket 94 for the reception of a ball 95. This ball is threaded onto a connecting stem 96 which carries at its other end a forked lug 97 for the reception of the swivel pin 37 for the terminal 36. This ball and socket joint provides the universal connection, and adjustment is made by the relative movement of the sleeve and holder, the usual locking nut 98 being provided. As in the other forms described, the holder is threaded to receive the stop plug 33.

In Fig. 21 is shown a further modification. The stay 25 is embraced between wedge-shaped anchoring members 101 which are like those first described, except that, instead of being separate plates, they are formed integral with a threaded connecting stem 102. The anchoring members are held in the wedge-shaped socket of a holder 103 which has a cylindrical sleeve 104 threaded on the interior to receive the stem 102. To provide the universal connection, the stem 102 has a tongue 105 similar to the tongue 66 of Figs. 14 and 15 for receiving the pin 69 and the yoke member there shown. In the embodiment just described undue backward movement of the anchoring members is prevented as the latter are integral with the stem 102. Adjustment is made by relative movement of the holder and the stem 102, the usual locking nut 106 being provided.

The modification illustrated in Fig. 22 is identical with the form shown in Fig. 21, except that one of the anchoring members 107 is a separate plate. Undue backward movement of the anchoring members is prevented, as one is integral with the stem and the other is stopped by engagement with the stem. If desired, both anchoring members may be separate plates.

What is claimed is:

1. In securing means for aeroplane stays and the like, the combination with a stay formed adjacent its end with crimps of varying degree, of a plurality of anchoring members correspondingly formed to embrace the crimped portion, and means for holding said members in interlocking relation with the crimped stay.

2. In securing means for aeroplane stays and the like, the combination with a stay formed adjacent its end with crimps of varying degree, of a plurality of wedge-shaped anchoring members correspondingly formed to embrace the crimped portion of the stay, and wedge-shaped means for holding said anchoring members in interlocking relation with the crimped stay.

3. In securing means for aeroplane stays and the like, the combination with a stay formed adjacent its end with crimps of varying degree, of a plurality of anchoring members correspondingly formed to embrace the crimped portion of the stay and formed to be substantially frusto-conical in the aggregate, and a frusto-conical holder for holding said anchoring member in interlocking relation with the crimped stay.

4. In securing means for aeroplane stays and the like, a terminal, a stay formed adjacent its end with crimps of varying degree, and means for connecting the stay with said terminal, including means for cooperating with the crimped portion for anchoring the stay.

5. In securing means for aeroplane stays and the like, the combination with a terminal, of a stay formed adjacent its end with crimps of varying degree, a plurality of wedge-shaped anchoring members correspondingly formed to embrace the crimped portion of the stay, wedge-shaped means for holding said anchoring members in interlocking relation with the crimped stay, and connecting means between said holding means and said terminal.

6. In securing means for aeroplane stays and the like, the combination with a terminal, of a stay formed adjacent its end with crimps of varying degree, a plurality of wedge-shaped anchoring members correspondingly formed to embrace the crimped portion of the stay, wedge-shaped means for holding said anchoring members in interlocking relation with the crimped stay, connecting means between said holding means and said terminal, and means for adjusting said connecting means.

7. In securing means for aeroplane stays and the like, the combination with a terminal, of a stay formed adjacent its end with crimps of varying degree, a plurality of anchoring members correspondingly formed to embrace the crimped portion of the stay and formed to be substantially frusto-conical in the aggregate, a frusto-conical holder for holding said anchoring members in interlocking relation with the crimped stay, and connecting means between said holder and the terminal.

8. A substantially rigid and non-flexible stay or the like formed adjacent its end with crimps of varying degree, and means cooperating with the crimped portion for anchoring the stay.

9. A substantially rigid and non-flexible stay or the like formed adjacent its end with crimps, the first crimp being relatively slight and the others of greater degree, and means cooperating with the crimped portion for anchoring the stay.

10. A substantially rigid and non-flexible stay or the like formed adjacent its end with crimps gradually increasing in degree toward the end of the stay, and means cooperating with the crimped portion for anchoring the stay.

In testimony whereof, I have hereunto set my hand.

HAROLD J. HORN.